(12) United States Patent
Liu et al.

(10) Patent No.: US 11,472,309 B2
(45) Date of Patent: Oct. 18, 2022

(54) SYSTEMS AND METHOD OF BATTERY CHARGING

(71) Applicant: FORD GLOBAL TECHNOLOGIES, LLC, Dearborn, MI (US)

(72) Inventors: Minghong Liu, Plymouth, MI (US); Kent Snyder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/878,199

(22) Filed: May 19, 2020

(65) Prior Publication Data
US 2021/0362619 A1 Nov. 25, 2021

(51) Int. Cl.
*B60L 58/12* (2019.01)
*B60L 53/10* (2019.01)
*B60L 53/62* (2019.01)

(52) U.S. Cl.
CPC .............. *B60L 58/12* (2019.02); *B60L 53/11* (2019.02); *B60L 53/62* (2019.02)

(58) Field of Classification Search
CPC .......... B60L 58/12; B60L 53/11; B60L 53/62; B60L 2240/80; B60L 53/00; Y02T 10/70; Y02T 10/7072; Y02T 90/12; Y02T 90/14; H02J 7/0068; H02J 7/0013; H02J 7/007; H01M 10/44; H01M 10/441
USPC ........................................................ 320/104
See application file for complete search history.

(56) References Cited

U.S. PATENT DOCUMENTS

| | | | |
|---|---|---|---|
| 5,561,360 A | 10/1996 | Ayres et al. | |
| 8,643,342 B2 | 2/2014 | Mehta et al. | |
| 8,803,473 B2 | 8/2014 | Lu | |
| 9,793,736 B2 | 10/2017 | Luo et al. | |
| 2002/0050805 A1* | 5/2002 | Petrovic | H02J 7/0048 320/130 |
| 2013/0063080 A1* | 3/2013 | Shiraishi | H02J 7/0014 320/107 |
| 2014/0242445 A1* | 8/2014 | Gozdz | H01M 4/136 429/158 |
| 2017/0244136 A1 | 8/2017 | Wang et al. | |

(Continued)

FOREIGN PATENT DOCUMENTS

| | | |
|---|---|---|
| CN | 107069120 A | 8/2017 |
| WO | 2016074426 A1 | 5/2016 |

OTHER PUBLICATIONS

Purushothaman, B. K., and U. Landau. "Rapid charging of lithium-ion batteries using pulsed currents a theoretical analysis." Journal of The Electrochemical Society 153.3 (2006): A533-A542.

(Continued)

*Primary Examiner* — Paul Dinh
(74) *Attorney, Agent, or Firm* — David B Kelley; Brooks Kushman P.C.

(57) ABSTRACT

A method for charging a traction battery of an electric vehicle includes, in response to a request to charge a traction battery, initially discharging the traction battery, for a first duration of time, according to a discharge stage having a constant power; subsequently charging the traction battery, for a second duration of time, according to a charge stage having a constant current; and repeating the discharge stage and the charge stage in sequence until the battery is charged.

20 Claims, 3 Drawing Sheets

(56) References Cited

U.S. PATENT DOCUMENTS

2019/0140324 A1   5/2019   Mevay

OTHER PUBLICATIONS

Purushothaman, B. K., P W. Morrison, and U. Landau. "Reducing mass-transport limitations by application of special pulsed current modes." Journal of The Electrochemical Society 152.4 (2005): J33-J39.

* cited by examiner

SYSTEMS AND METHOD OF BATTERY CHARGING

TECHNICAL FIELD

This disclosure relates to rechargeable batteries and more particularly to fast charging of traction batteries for electric vehicles.

BACKGROUND

Electric vehicles and other applications include a high-voltage (HV) battery for powering one or more electric machines. Many applications use lithium-ion cell chemistry. The batteries are rechargeable using an at-home or commercial charging station. The charging station may use alternating current (AC) or direct current (DC) to charge the battery. DC fast charging is an emerging technology that offers the potential to reduce charging times making long-distance travel of electric vehicles more feasible.

SUMMARY

According to one embodiment, a method for charging a traction battery of an electric vehicle includes, in response to a request to charge a traction battery, initially discharging the traction battery, for a first duration of time, according to a discharge stage having a constant power; subsequently charging the traction battery, for a second duration of time, according to a charge stage having a constant current; and repeating the discharge stage and the charge stage in sequence until the battery is charged.

According to another embodiment, a method for charging a traction battery of an electric vehicle includes, in response to a request to charge a traction battery, initially discharging the traction battery, for a first duration of time, according to a discharge pulse having a constant power; and subsequently charging the traction battery, for a second duration of time, at a constant current.

According to yet another embodiment, a battery changing system includes a charger and a controller. The controller is programmed to receive a request to charge a battery, and, in response to the request, command the charger to initially discharge the battery, for a first duration of time, according to a discharge stage having a constant power. The controller is further programmed to subsequently command the charger to charge the battery, for a second duration of time, according to a charge stage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle or other device may include one or more electric motors (or other loads) powered by a HV battery, which is sometimes referred to as a traction battery when used in a vehicle. Used herein, "high voltage" refers to a voltage exceeding 42 V AC or 60 V DC. "Low voltage" refers to voltages that are not high. The battery, sometimes referred to as a battery pack or battery assembly, stores energy that can be used by a load. The battery provides a high-voltage (HV) direct current (DC) output from one or more battery cell arrays, sometimes referred to as battery cell stacks, within the traction battery. The battery cell arrays may include one or more battery cells arranged in series, parallel, or a combination of both. The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. The cells may be lithium-ion or other chemistry.

Figure 1:
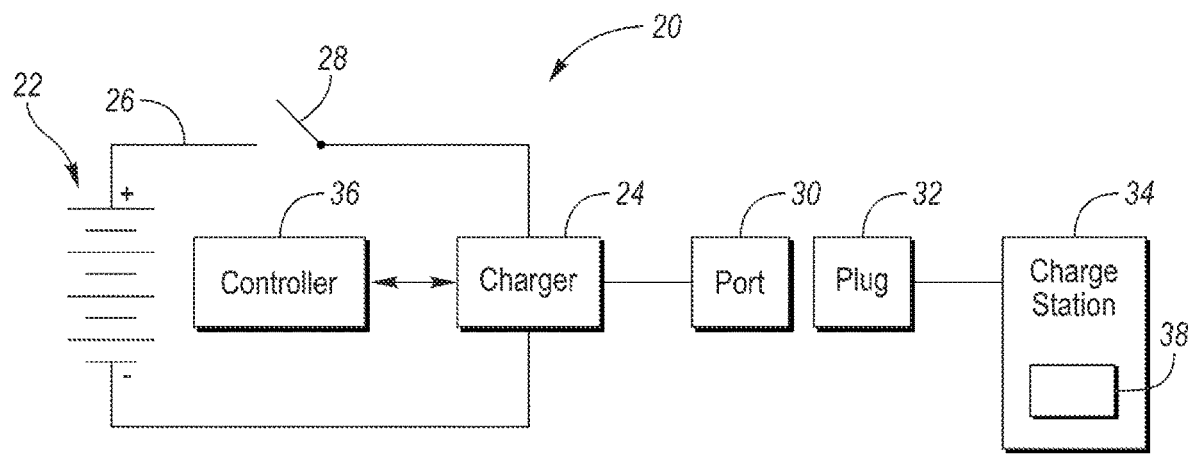
FIG. 1 is a schematic diagram of a battery charging system.

Referring to FIG. 1, a battery charging system 20 includes a battery 22 that is electrically connected with a charger 24 by a high-voltage circuit 26. The circuit 26 may include one or more contactors (or other switching arrangement) 28 that selectively connect the charger 24 and the battery 22. The charger 24 includes an associated charge port 30 configured to mate with a plug 32 of the charge station 34. The charger 24 includes an associated controller 36 program to facilitate the transfer of power from the charge station 34 to the battery 22. The charge station 34 may also include an associated controller 38. The controllers 36 and 38 are configured to communicate with each other to control the transfer of power. In some embodiments, particularly for DC charging, the charger 24 may be omitted. The charger 24 may also be located in the charging station rather than the device to be charged.

The controller 36, the controller 38, or a combination thereof is configured to control a charging profile used to charge the battery 22. The charging profile includes the direction of charge (charge or discharge), the voltage, the current, and the mode of charge (e.g., constant current, constant voltage, constant power, etc.). The charger 24 and the charging station 34 are configured for AC or DC charging or, in some embodiments, both AC and DC. According to one embodiment, the charger 24 and the charging station 34 are configured for DC fast charge. While not illustrated, one or more current/voltage sensors may be provided on the device side and the charging station 34 to provide feedback used by the controllers 36, 38 to control charging.

The controllers generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The controller communicates with other vehicle systems and other controllers over one or more wired or wireless vehicle connections using common bus protocols (e.g., CAN and LIN). Any reference to a controller refers to one or more controllers.

Traditional charging profiles for batteries include a constant-current and constant-voltage process (CC-CV) that is applied until the battery is charged to a sufficient level. Typically, the current is applied at 1 C (also known as a C-rate of 1) or less. A "C" or "C-rate" is a measure of the rate at which a battery is charged or discharged relative to its capacity. The C-rate is defined as the charge or discharge current divided by the battery's capacity to store an electrical charge. A C-rate of 1 (also known as 1 C) is the current level that will fully discharge (or charge) the battery in one hour while a C-rate of 2 (2 C) is the current level that will fully discharge (or charge) the battery in one half-hour (30 minutes). The charge time for the battery can be decreased by increasing the C-rate of the charging process.

Increasing the C-rate, however, generally has a detrimental effect on the cycle life of the battery when using traditional charging techniques. Under high C-rates, limits due to ionic transfer rate (concentration polarization) may be exceeded. This may result in lithium being deposited on the anode surface or other degradation effects. These effects may limit intercalation of lithium ions into the inter-planes of the graphite anode and may lead to increased interface layer growth at the anode surface. This may also increase the risk of lithium dendrite growth in some cell configurations and cause associated detrimental effects.

The desire for faster charging times is further complicated by the parallel desire to increase energy density of the battery. Increasing battery energy density typically requires compact electrode designs that restrict the accessibility within the electrode to intercalation sites. This, in conjunction with high C-rate charging, jeopardizes the cycle life of the battery due to undesirable effects such as lithium plating, self-heating, and impedance increase. Described below are solutions that advance fast charge capability without sacrificing battery energy density and battery life.

Figure 2:
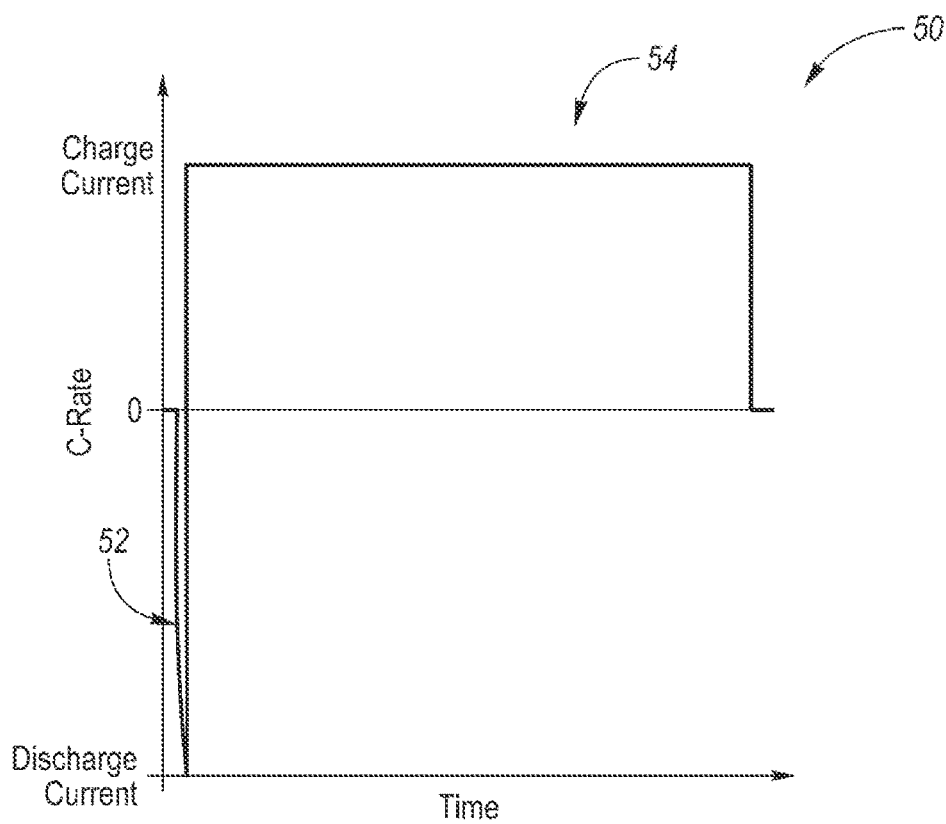
FIG. 2 is a plot illustrating a charging profile according to one or more first embodiments.

Referring to FIG. 2, Applicant has discovered an improved charging profile 50 that provides fast charging without reducing battery longevity. The charging profile 50 may be used for both AC and DC charging. The illustrated profile 50 is for DC fast charge. The charging profile 50 begins with a discharge pulse (discharge phase) 52 in which the battery is briefly discharged. The discharge pulse 52 occurs for a short duration of time, e.g., 0.5 to 30 seconds, and has a constant power. The constant power may be between 25 and 1000 kilowatts (kW) for example. The current of the discharge pulse 52 is variable. In the illustrated embodiment, the current increases over the duration of time and peaks at the end of the discharge pulse 52. Immediately following the discharge pulse 52, the charging profile charges the battery according to a constant current 54. The constant current 54 may be between 0.5 to 12 C. The C-rate chosen for the profile 50 depends upon the characteristics of the battery, and therefore, the profile 50 is not limited to any particular C-rate. The constant current 54 is applied until the battery is sufficiently charged or charging is commanded to end. Various techniques may be used to determine a charging end point, such as the battery reaching a state-of-charge target, a voltage target, a time limit, or a tapered-current level target.

Figure 3:
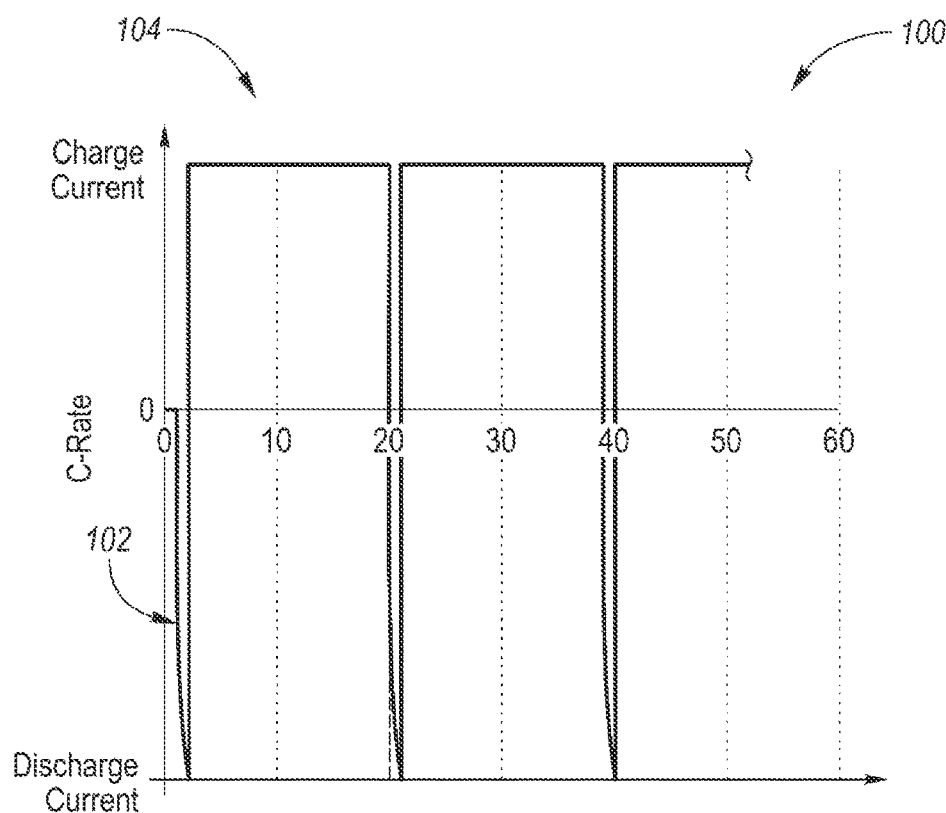
FIG. 3 is a plot illustrating a charging profile according to one or more second embodiments.

Referring to FIG. 3, a charging profile 100 according to another embodiment uses a repeating pattern of discharge and charge stages. The repeating pattern may further increase battery life without significantly prolonging charge sessions. Similar to the charge profile 50, battery charging begins with a discharge stage 102 in which the battery is discharged at a constant power. The discharge stage 102 is applied for a first duration of time e.g., 0.5 to 30 seconds. Once the first duration of time expires, a charging stage 104 is applied to the battery. The charging stage 104 has a constant current such as between 0.5 to 12 C. The charging stage 104 is applied for a second duration of time, such as 2 to 30 minutes or more particularly 2 to 10 minutes in some embodiments. The first and second durations of time may be predetermined. Once the second duration of time has ended, the sequence is repeated with the battery again being discharged according to the discharge stage 102. The profile 100 repeatedly performs the discharge stage 102 and the charge stage 104 until the battery is sufficiently charged.

The currents used in the discharge stage 102 and the charge stage 104 may be similar to each other or may substantially differ. In some embodiments, the charge current 104 may be larger than a peak of the discharge current 102, or the peak of the discharge current 102 may be larger than the charge current 104.

While charging profiles 50 and 100 include a constant current phase, this disclosure is not limited to profiles having a constant current phase. In alternative embodiments, the constant current phase may be replaced with a variable current phase. Alternatively or additionally, the charging profile may include a constant voltage stage.

The profiles 50 and 100, and more particularly the constant-power discharge stage at charging initialization, through testing have been shown to improve fast charge cycle life and improve coulombic efficiency compared to prior art charging profiles. Testing has shown that applying the discharge stage initially is superior to applying the discharge stage following an initial charge stage. Testing has also shown that applying the discharge pulse at a constant power is more effective (longer battery life and coulombic efficiency) than applying a discharge pulse at a constant current. Applicant's testing indicates that, for a limited duration discharge pulse, conducting the discharge pulse in a constant power mode more efficiently reduces the concentration gradient and polarization level as compared to conducting the discharge pulse in a constant current mode, due to the fundamental differences in the relative voltage verses current levels during the duration of the pulse.

Referring back to FIG. 1, the charger 24 and/or the station 34 may have bi-directional capability to provide the discharge load for the discharge pulse. For example, the discharge pulse power may go to the source of the charging station 34, e.g., the power grid. Additionally or alternatively, a vehicle (or other chargeable device) may be able to provide the discharge load for the discharge pulse.

Control logic or functions performed by controller 36/38 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
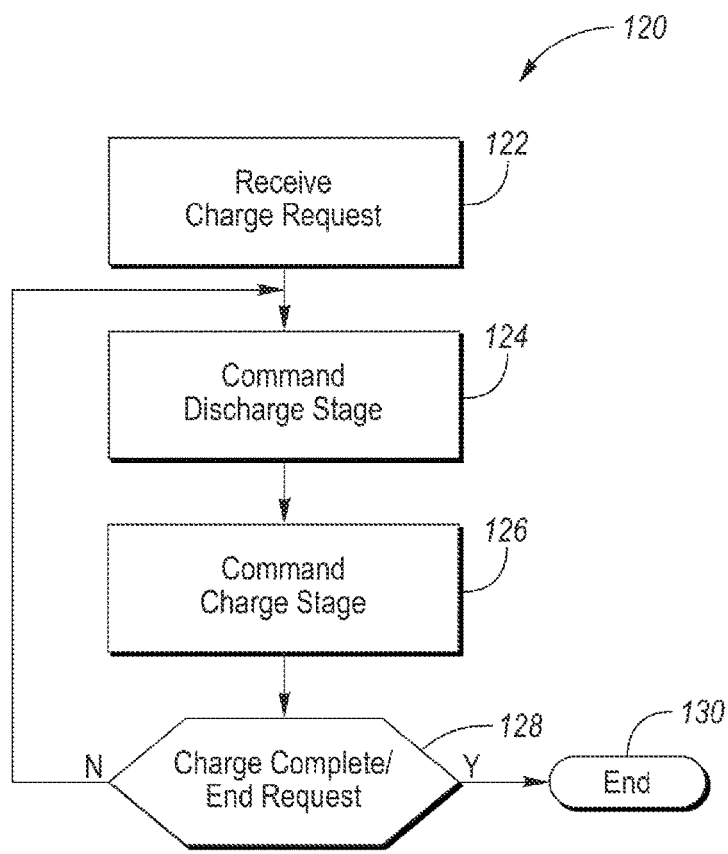
FIG. 4 is a flowchart of an algorithm executable by a controller to perform a battery charging operation according to the charging profiles of this disclosure.

FIG. 4 illustrates a flow chart 120 of an algorithm executable by at least one controller to perform the charging profile 100. The controls began at operation 122 when a request to initiate charging is received. In response to receiving the request, the controller initially commands a discharge stage at operation 124. The discharge stage may be the discharged stage 102 discussed above. The discharge stage is commanded for a first duration of time. Once the first duration of time ends, control passes operation 126, and the controller commands the charge stage. The charge stage may be the charge stage 104 discussed above. The charge stage is commanded for a second duration of time. After the second duration of time ends, control passes to operation 128 and the controller determines if the battery is charged or a request to end charging has been received. If yes, the charging ends at operation 130. If no, control loops back and the controller repeatedly cycles through the operations 124 and 126 until the battery is charged or a requested stop is received. While the flow chart 120 is for profile 100, a modified flowchart for profile 50 includes extending operation 126 until the battery is charged or a request to stop is received.

Figure 5:
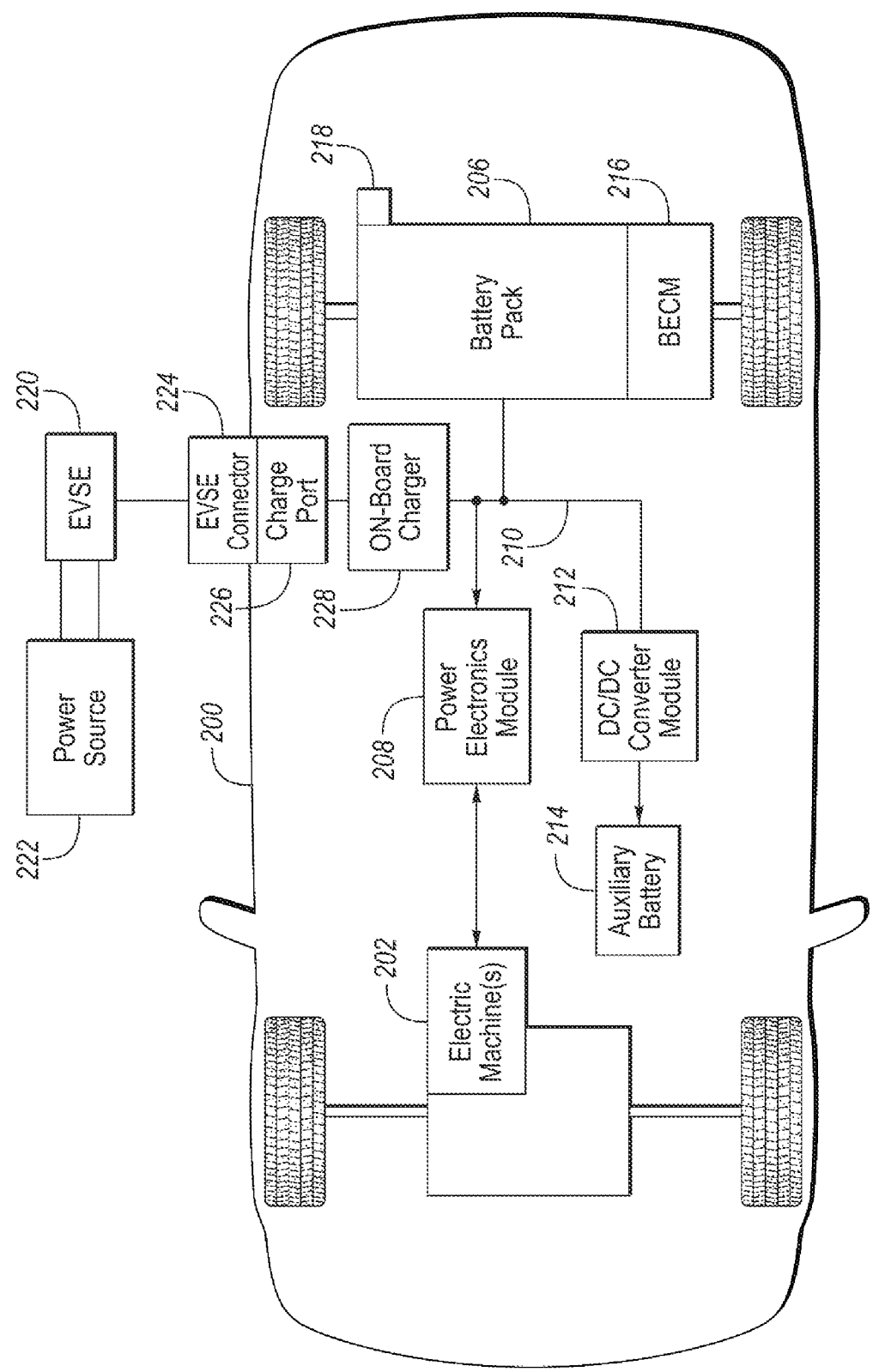
FIG. 5 is a schematic diagram of an electrified vehicle configured for charging according to the charging profiles of this disclosure.

The above-described controls and charging profiles may be used in a variety of fields including electric vehicles. FIG. 5 illustrates an electric vehicle that may be charged according the charging profiles, e.g., 50 and 100, of this disclosure.

A vehicle 200 includes one or more electric machines 202 mechanically connected to driven wheels. The electric machine(s) 202 may be capable of operating as a motor or a generator. The electric machine 202 can provide propulsion and slowing capability, e.g., regenerative braking. A traction battery or battery pack 206 stores energy that can be used by the electric machines 202 and other vehicle systems. The traction battery 206 may be electrically connected to one or more power electronics modules 208 through one or more contactors. The one or more contactors isolate the traction battery 206 from other components when opened and connect the traction battery 206 to other components when closed. A power electronics module 208 is also electrically connected to the electric machines 202 and a high-voltage bus 210 and provides the ability to bi-directionally transfer energy between the traction battery 206 and the electric machines 202. For example, a typical traction battery 206 may provide a direct current (DC) voltage while the electric machines 202 may use a three-phase alternating current (AC) to function. The power electronics module 208 may convert the DC voltage to a three-phase AC current used by the electric machines 202. In a regenerative mode, the power electronics module 208 may convert the three-phase AC current from the electric machines 202 acting as generators to the DC voltage used by the traction battery 206. The description herein is equally applicable to a hybrid-electric vehicle.

In addition to providing energy for propulsion, the traction battery 206 may provide energy for other vehicle electrical systems. A typical system may include a DC/DC converter module 212 that converts the high-voltage DC output of the traction battery 206 to a low-voltage DC supply that is compatible with other vehicle components. Other high-voltage loads, such as compressors and electric heaters, may be connected directly to the high-voltage supply without the use of a DC/DC converter module 212. In a typical vehicle, the low-voltage systems are electrically connected to an auxiliary battery 214 (e.g., a 12-volt battery). In other embodiments, the battery 214 may be 24 or 48 volts.

A controller, e.g., a battery energy control module (BECM) 216, may be in communication with the traction battery 206. The BECM 216 may act as a controller for the traction battery 206 and may also include an electronic monitoring system that manages temperature and charge state of each of the battery cells. The traction battery 206 may have a temperature sensor 218 such as a thermistor or other temperature sensor. The temperature sensor 218 may be in communication with the BECM 216 to provide temperature data regarding the traction battery 206.

The vehicle 200 may be recharged by an AC charging station, such as electric vehicle supply equipment (EVSE) 220, connected to an external power source 222. The external power source 222 may be an electrical power distribution network or grid as provided by an electric utility company. As shown, the external power source may be electrically coupled to the EVSE 220. Although the EVSE 220 is shown external to electric vehicle 200, it is also contemplated that EVSE 220 may be located within electric vehicle 200.

The EVSE 220 may receive and transfer the received electrical power through a cord and connector 224 that plugs into a mating charge port 226 on the electric vehicle 200. As one example, the external power may be AC power received at the charge port 226 that is converted to DC power by an on-board charger 228 located within the electric vehicle 200. The on-board charger 228 may then operate to charge the traction battery 206. It is contemplated that the EVSE 220 may be realized in different mechanical configurations including a vehicle charger, a charging station, or a charger. It is also contemplated that the EVSE 220 may be installed as wall-mounted units in a garage, alongside a building where vehicles typically park, or in a stand-alone unit. The EVSE 220 may be a cord set which is sometimes referred to as a travel charger, portable charger, or handheld charger. The EVSE 220 and the vehicle may be according to standards such as SAE J1772. The charger 228 and/or the charger of the EVSE are configured to charge the battery 206 according the above described charging profiles.

The vehicle 200 may also be configured for DC fast charge. The vehicle charge port 226 may also include a pair of DC pins configured to connect with a DC charger or DC EVSE. The DC pins of the port 226 may connect through an on-board charger 228 (or a differ charger) or route to the battery 206 without the need of an on-board charger. The charger 228 and/or the charger of the EVSE are configured to charge the battery 206 according the above described charging profiles.

It is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for charging a traction battery of an electric vehicle, the method comprising:
   in response to a request to charge a traction battery, initially discharging the traction battery, for a first duration of time, according to a discharge stage having a constant power;
   subsequently charging the traction battery, for a second duration of time, according to a charge stage having a constant current; and
   repeating the discharge stage and the charge stage in sequence until the battery is charged.

2. The method of claim 1, wherein the first and second durations of time are predetermined.

3. The method of claim 2, wherein the second time is longer than the first time by a factor of at least 3.

4. The method of claim 1, wherein the discharge stage includes variable current over the first duration of time.

5. The method of claim 1, wherein a peak current of the discharge stage and the constant current of the charge stage have a ratio of 0.5 to 2.

6. The method of claim 1, wherein the constant current is between 0.5 to 12 C.

7. The method of claim 6, wherein the constant power is between 25 and 1000 kilowatts.

8. The method of claim 1, wherein current applied during the discharge stage increases over the first duration of time.

9. A method for charging a traction battery of an electric vehicle, the method comprising:
   in response to a request to charge a traction battery, initially discharging the traction battery, for a first duration of time, according to a discharge pulse having a constant power; and
   subsequently charging the traction battery, for a second duration of time, at a constant current.

10. The method of claim 9, wherein the first duration of time is predetermined.

11. The method of claim 10, wherein the first duration of time is 0.5 to 30 seconds.

12. The method of claim 9, wherein the discharge pulse includes variable current over the first duration of time.

13. The method of claim 12, wherein current applied during the discharge pulse discharge increases over the first duration of time.

14. The method of claim 9, wherein a peak current of the discharge pulse and the constant current have a ratio of 0.5 to 2.

15. A battery changing system comprising:
    a charger; and
    a controller programmed to:
      receive a request to charge a battery,
      in response to the request, command the charger to initially discharge the battery, for a first duration of time, according to a discharge stage having a constant power, and
      subsequently command the charger to charge the battery, for a second duration of time, according to a charge stage.

16. The battery charging system of claim 15, wherein the charge stage has a constant current.

17. The battery charging system of claim 15, wherein the controller is further programmed to command the charger to repeat the discharge stage and the charge stage in sequence until the battery is charged.

18. The battery charging system of claim 17, wherein the first and second durations of time are predetermined.

19. The battery charging system of claim 18, wherein the second time is longer than the first time by a factor of at least 3.

20. The battery charging system of claim 15, wherein the charger is a direct-current charger.

* * * * *